(12) United States Patent
Pappas (10) Patent No.: US 12,520,832 B2
(45) Date of Patent: Jan. 13, 2026

(54) FISHING REEL SPOOL REMOVAL

(71) Applicant: KOBO Labs LLC, Houston, TX (US)

(72) Inventor: Michael Pappas, Houston, TX (US)

(73) Assignee: KOBO Labs LLC, Houston, TX (US)

( * ) Notice: Subject to any disclaimer, the term of this patent is extended or adjusted under 35 U.S.C. 154(b) by 332 days.

(21) Appl. No.: 18/179,889

(22) Filed: Mar. 7, 2023

(65) Prior Publication Data
US 2023/0284604 A1    Sep. 14, 2023

Related U.S. Application Data

(60) Provisional application No. 63/317,646, filed on Mar. 8, 2022.

(51) Int. Cl.
   *A01K 89/01*    (2006.01)
   *A01K 89/015*   (2006.01)

(52) U.S. Cl.
   CPC .... *A01K 89/01924* (2015.05); *A01K 89/0111* (2013.01); *A01K 89/01931* (2015.05)

(58) Field of Classification Search
   CPC ........ A01K 89/01922; A01K 89/01923; A01K 89/059; A01K 89/017; A01K 89/01916; A01K 89/01917
   See application file for complete search history.

(56) References Cited

U.S. PATENT DOCUMENTS

| | | | | |
|---|---|---|---|---|
| 901,609 | A * | 10/1908 | Gaskins | A01K 89/015 242/313 |
| 4,482,106 | A * | 11/1984 | Kovalovsky | A01K 89/015 242/321 |
| 4,848,696 | A * | 7/1989 | Patterson | A01K 89/027 242/246 |
| 5,370,331 | A * | 12/1994 | Sato | A01K 89/015 242/313 |
| 2005/0224617 | A1 * | 10/2005 | Nakagawa | A01K 89/01922 242/310 |
| 2005/0253007 | A1 * | 11/2005 | Ikuta | A01K 89/033 242/245 |
| 2016/0345562 | A1 * | 12/2016 | Baldwin | A01K 89/01922 |
| 2019/0141973 | A1 * | 5/2019 | Oogose | A01K 89/0193 242/314 |

FOREIGN PATENT DOCUMENTS

| | | | | |
|---|---|---|---|---|
| JP | H0567260 U | * | 9/1993 | ....... A01K 89/01923 |
| JP | H0634463 U | * | 5/1994 | ....... A01K 89/01922 |
| JP | H1052196 A | * | 2/1998 | ....... A01K 89/01923 |
| JP | 2001145442 A | * | 5/2001 | ....... A01K 89/01557 |
| JP | 2014050334 A | * | 3/2014 | ........... A01K 89/033 |
| KR | 20210021799 A | * | 3/2021 | ........... A01K 89/017 |

* cited by examiner

*Primary Examiner* — Emmanuel M Marcelo
(74) *Attorney, Agent, or Firm* — Yee & Associates, P.C.

(57) ABSTRACT

A removable reel system includes a frame, a removable frame assembly, and a first spool. The first spool affixed to the frame when the removable frame assembly is coupled to the frame via a locking assembly disposed on the removable frame assembly. The first spool is removable from the frame by disengaging the locking assembly to uncouple the removable frame assembly from the frame. A second spool is attachable to the frame by engaging the locking assembly to couple the removable frame assembly to the frame.

20 Claims, 6 Drawing Sheets

FISHING REEL SPOOL REMOVAL

PRIORITY CLAIM AND CROSS-REFERENCE TO RELATED APPLICATIONS

This application claims priority to, and the benefit of, U.S. Provisional Patent App. No. 63/317,646, filed Mar. 8, 2022, entitled FISHING REEL SPOOL REMOVAL, the entire contents of which are incorporated by reference herein and relied upon.

FIELD

The present invention relates to versatile fishing reels. More specifically, the invention relates to versatile fishing reels with removable frame parts, to provide for spool swapping. This allows for fisherman to have one reel and several different and varied spool/line options, rather than having multiple reels each individually spooled with different line types.

BACKGROUND

Fishing reels have been around for hundreds of years. The overall concept of fishing reels have remained relatively constant: a frame, a spool to hold line, a friction system to resist rotation of said spool, and a handle to turn the spool. Through the years, there have been improvements to each of these systems. Furthermore, specific tactics used to fish have changed, in part due to increased knowledge of fish species, braided fishing lines, increased reliability of boat technology, and improved access to new fishing grounds with faster vessels.

For these reasons, among others, fisherman often end up carrying many rod/reel combinations to target different species of fish. A particular rod may include a specific reel with a specific line type, spooled onto the reel; this particular rod is intended for fishing a particular species or tactic. Smaller boats may run out of space while carrying multiple rod/reel combinations. Furthermore, the budget-conscious fisherman may be unable to carry multiple rod/reel combinations due to the costs involved.

For these reasons, among others, improved versatile fishing reels are therefore needed.

SUMMARY

The fishing reel systems disclosed herein improve on current reel technology in a number of meaningful ways. The disclosed fishing reel is configured for easy swapping of reel spools. This allows for a single reel to have the spool swapped for a different spool, allowing fresh line or different line types to be quickly implemented. Different types of lines may be implemented when specific fishing tactics are being used. The reel spool can be removed and swapped independently of the reel's other sub-systems, such as the drag, the hand crank gears, the electrical module, level wind, and other similar sub-systems.

Because the spools can be swapped, an easily adjustable level wind is important. The line from the spool must be properly aligned to the level wind of the reel, and each spool will have a different starting point for where that particular line lays on the particular reel. Accordingly, an adjustable level wind permits the user to align the level wind and the line on the spool.

Similarly, the fishing reel's drag rate can be user-adjusted. This provides the user with the ability to tune the drag system to their own needs. Varying species or tactics require different drag rates.

Fishing reels are generally constructed of a frame, a spool or, more specifically, a spool with fishing line, shafts, gearing, and a handle. These components are typically assembled onto the frame in a fashion that does not allow for easy removal of the spool from the fishing reel. In traditional reel systems, components typically serve multiple purposes. For example, spools on traditional reels are used to transfer the compressive load from the drag springs to the drag clutch plates. In this instance, various nuts, bolts, washers, and the like prevent easy removal of the spool. During disassembly, the nuts, bolts, washers, and the like, require organization, or they may end up misplaced. This makes dissembling a reel difficult to say the least, particularly on a moving vessel on the water. Furthermore, the spool typically includes several components in addition to the line itself; thus, removal of the spool undesirably removes other components from the reel.

Via the disclosure herein, the spool can be removed from the reel assembly with minimal tools, if any. Upon removal of the spool, the other sub-systems of the reel remain intact. Importantly, the spool can be removed while on a vessel, allowing for seamless changes between spools and, thus, fishing lines.

As discussed in greater detail herein, a single side of the frame assembly can be fixed to the reel via one of several different methods that allow for easy disassembly. In an example embodiment, bolts are used to fix the single side of the frame assembly to the reel. The bolts are retained in the housing in some fashion. This would allow the bolts to be unthreaded from the main center frame assembly while remaining attached to the removable side frame. In a related embodiment, the bolts can be twisted without the use of tools for manual attachment/removal.

In another example embodiment, the main frame assembly and the side frame would contain threads. These two frame pieces would thread together. When the side frame is fully seated, a feature, such as a pin, can be used to stop rotation and thus prevent unthreading. A related embodiment would include implementing quarter turn mating features, rather than fully threading the two frames.

For example, by using quick pins, the side frame can be easily attached and reattached to the center frame. This would allow the removal of the side frame to be done quickly and without the use of tools. As an alternative to quick pins, quarter turn bolts could be implemented; quarter turn bolts would allow for alignment while also pulling the frame components together.

In yet another example embodiment, a draw or latching mechanism fixes the side frame assembly to the rest of the reel. Advantageously, a latching mechanism would not require any tools for removal.

In an example embodiment, when the side frame is removed it is tethered to the frame assembly. The removed side frame could include a wire, a retaining pin, a hinge, or some other component to ensure that the side frame remains physically attached to the frame assembly, so that it is not lost.

As mentioned briefly above, there are several ways to assemble and disassemble a fishing reel. The systems herein provide for easy spool swapping while ensuring that sub-systems are retained in their respective location. The systems herein also avoid the need of special tools for disassembly or assembly, while allowing for tuning of the system as it is assembled, along with several other important aspects.

The main tuning method for the user relates to the drag system. The rate at which pressure is applied to the drag system can be user-adjusted. While fishing the user rotates the drag lever to increase or reduce the drag resistance. Users sword fishing may want a very gradual drag system; for example, 180 degrees of lever motion while generating up to 45 lbs of drag (i.e., 0.25 lbs per degree). A gradual drag gives the user more control over applying pressure to the fish. More control results in fewer fish lost. A user pulling a dredge, on the other hand, might want a much tighter drag range; for example, 100 degrees of lever motion while generating up to 80 lbs of drag (i.e., 1.25 lbs per degree).

Furthermore, it should be appreciated that the systems for spool swapping disclosed herein can be used on any type of fishing reel, such as conventional or electric. In the past, rod versatility was an issue. To improve rod versatility, fisherman have used two-part rod systems to allow for different rods to be swapped to a single reel/butt assembly. Different rods are used for varying fishing tactics. An improved versatility will come from the swapping of spools just as the swapping of rods.

Also, when choosing a fishing style, the size of monofilament line has historically driven the size of reel to be used. With the advancement in braided fishing line, the discrepancy in line diameter driving reel size is less impactful. Braided lines of equal breaking strength to monofilament line are typically about 45% smaller in diameter. This has driven reel sizes to become more compact. The systems herein provide for the use of one reel with multiple spools with varying line diameters.

When spools are switched the alignment of the wound line and level wind is critical. Having an easily adjustable level wind makes this task easy. A simplified design allows for the use of a level wind block, line guide pins, diamond screw guide pawl, spring, and pull pin. By using a streamlined design, less parts are used to create the level wind guide block assembly.

In light of the disclosure herein, and without limiting the scope of the invention in any way, in a first aspect of the present disclosure, which may be combined with any other aspect listed herein unless specified otherwise, a removable reel system includes a frame, a removable frame assembly, and a first spool. The first spool affixed to the frame when the removable frame assembly is coupled to the frame via a locking assembly disposed on the removable frame assembly. The first spool is removable from the frame by disengaging the locking assembly to uncouple the removable frame assembly from the frame. A second spool is attachable to the frame by engaging the locking assembly to couple the removable frame assembly to the frame.

In a second aspect of the present disclosure, which may be combined with any other aspect listed herein unless specified otherwise, prior to removing the first spool from the frame, a spool nut is removed.

In a third aspect of the present disclosure, which may be combined with any other aspect listed herein unless specified otherwise, after attaching the second spool to the frame, the spool nut is reattached prior to engagement of the locking assembly.

In a fourth aspect of the present disclosure, which may be combined with any other aspect listed herein unless specified otherwise, the removable frame assembly is rotatably coupled to the frame.

In a fifth aspect of the present disclosure, which may be combined with any other aspect listed herein unless specified otherwise, the removable frame assembly includes at least one protrusion, and the frame includes at least one recess, such that the protrusion is configured to translate within the recess.

In a sixth aspect of the present disclosure, which may be combined with any other aspect listed herein unless specified otherwise, the locking assembly engages a keyhole disposed on the frame.

In a seventh aspect of the present disclosure, which may be combined with any other aspect listed herein unless specified otherwise, the locking assembly includes a locking pin retained within a bushing, such that the locking pin is configured to translate laterally within the bushing.

In an eighth aspect of the present disclosure, which may be combined with any other aspect listed herein unless specified otherwise, the locking assembly includes a spring, configured to bias the locking pin into a closed position.

In a ninth aspect of the present disclosure, which may be combined with any other aspect listed herein unless specified otherwise, the locking assembly includes a pin knob, configured to be grasped by a user.

In a tenth aspect of the present disclosure, which may be combined with any other aspect listed herein unless specified otherwise, biasing of the spring may be overcome by pulling the pin knob.

In an eleventh aspect of the present disclosure, which may be combined with any other aspect listed herein unless specified otherwise, the removable reel system further includes a drag system including a drag lever disposed adjacent to the removable frame assembly.

In a twelfth aspect of the present disclosure, which may be combined with any other aspect listed herein unless specified otherwise, rotation of the drag lever causes expansion of a drag cam assembly and increases pressure on a drag clutch assembly.

In a thirteenth aspect of the present disclosure, which may be combined with any other aspect listed herein unless specified otherwise, the removable reel system further includes a drive motor.

In a fourteenth aspect of the present disclosure, which may be combined with any other aspect listed herein unless specified otherwise, the drive motor delivers power to a spool shaft to cause rotation of the first spool.

In a fifteenth aspect of the present disclosure, which may be combined with any other aspect listed herein unless specified otherwise, power from the drive motor is delivered via a drive hub and a drag clutch assembly to the spool shaft.

In a sixteenth aspect of the present disclosure, which may be combined with any other aspect listed herein unless specified otherwise, the removable reel system further includes an adjustable level wind system.

In a seventeenth aspect of the present disclosure, which may be combined with any other aspect listed herein unless specified otherwise, a spool shaft includes a gear configured to rotate the adjustable level wind system.

In an eighteenth aspect of the present disclosure, which may be combined with any other aspect listed herein unless specified otherwise, the adjustable level wind system further comprises a guide assembly and a diamond screw, and the diamond screw is configured to convert rotational motion of the gear into linear motion of the guide assembly.

In a nineteenth aspect of the present disclosure, which may be combined with any other aspect listed herein unless specified otherwise, the guide assembly includes a guide block configured to engage with the diamond screw.

In a twentieth aspect of the present disclosure, which may be combined with any other aspect listed herein unless specified otherwise, the guide assembly includes an adjustable line guide, configured to direct fishing line onto the first spool.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be limiting the scope of the present disclosure, the present disclosure is described and explained with additional specificity and detail through the use of the accompanying figures. The figures are listed below.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
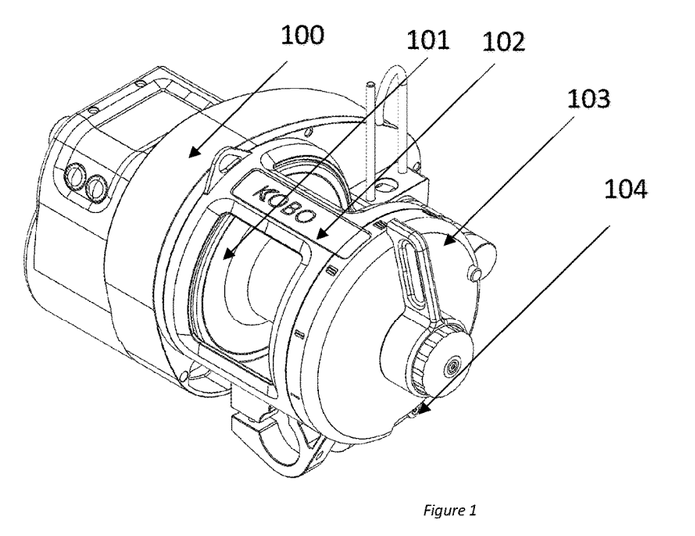
FIG. 1 illustrates a perspective view of a fishing reel with a spool swapping system, according to an example embodiment of the present disclosure.

With reference to the Figures, FIG. 1 illustrates a reel system with a tool-less swappable spool that is fully assembled. Generally, the reel system includes a frame assembly 100 including center frame 102, a removable spool 101, a removable frame assembly 103 (also referred to as a side frame herein), and a removable frame release mechanism 104. As illustrated herein, the reel includes a locking pin feature as the removable frame release mechanism 104, also referred to herein as locking pin assembly 104; it should be appreciated, however, that other retention features such as clamps, latches, nuts and bolts, and the like could be used as alternative means for coupling and decoupling various components of the reel systems disclosed herein. The locking pin assembly 104 is illustrated in a closed configuration, to retain the integrity of the removable frame assembly 103. The removable frame assembly 103 fits onto the center frame 102 and rotated into position. Once aligned properly the locking pin assembly 104 engages the center frame 102 and resists rotation of the removable frame 103.

Figure 2:
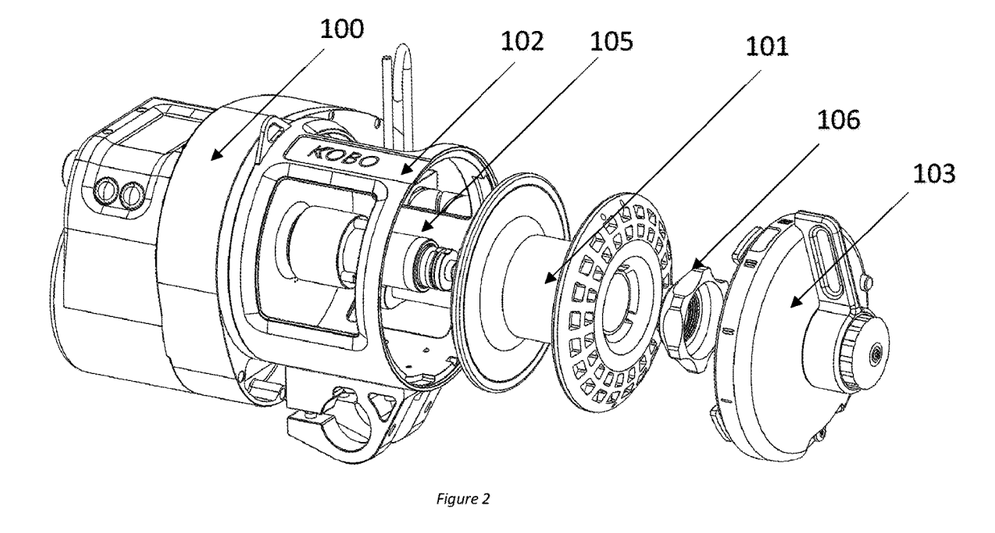
FIG. 2 illustrates an exploded view of the unassembled frame and removed spool, according to an example embodiment of the present disclosure.

In the exploded view shown in FIG. 2, the removable frame assembly 103 has been decoupled from the frame assembly 100. The center frame 102 includes one or more mating features for the removable frame 103 and locking assembly 104. Once the removable frame 103 is detached from center frame 102, the spool nut 106 is removed to release the spool 101 from the frame assembly 100. The frame assembly 100 retains the remaining critical features without further disassembly, such as the spool hub 105, which is retained within the frame assembly 100; importantly, as illustrated by FIG. 2, spool 101 is the only component that is removed from the decoupled frame assembly 100 (as all remaining features are retained on frame assembly 100). As can be appreciated, a different spool (not shown) can then be installed onto frame assembly 100 and fixed by reattachment of spool nut 106; installation time and ease of installation are improved, as the different spool is the only component that is installed onto frame assembly 100 (as all remaining features are retained on frame assembly 100). Removable frame 103 can then be re-coupled to the frame assembly 100, such that the different spool is ready for use with frame assembly 100.

Figure 3:
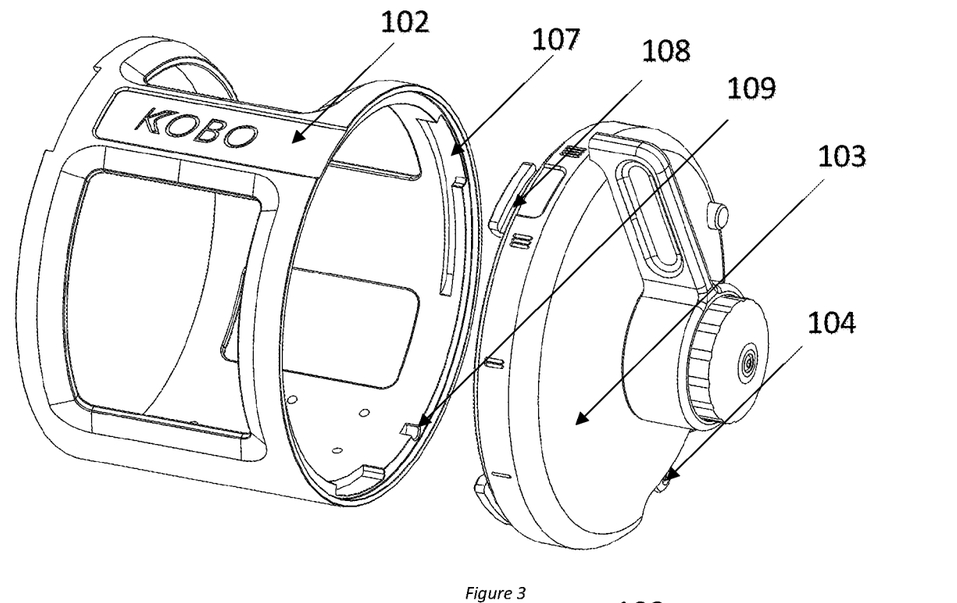
FIG. 3 illustrates an exploded of the center frame and removable frame assembly, highlighting the locking mechanisms, according to an example embodiment of the present disclosure.

FIG. 3 depicts how the center frame 102 and removable frame 103 mate to each other. In an embodiment, the center frame 102 includes female mating retention features 107 and the removable frame includes male retention mating features 108. As the removable frame 103 mates into the center frame 102, the retention features engage with a few degrees of rotation. Once rotated the full amount, the locking pin assembly 104 locks into a rotational locking feature 109 on the center frame 102. At this point the removable frame 103 cannot be disassembled without first pulling the locking pin assembly 104 out of the rotational locking feature 109 and then rotating the removable frame 103 to disengage the female retention features 107 and male retention features 108.

Figure 4:
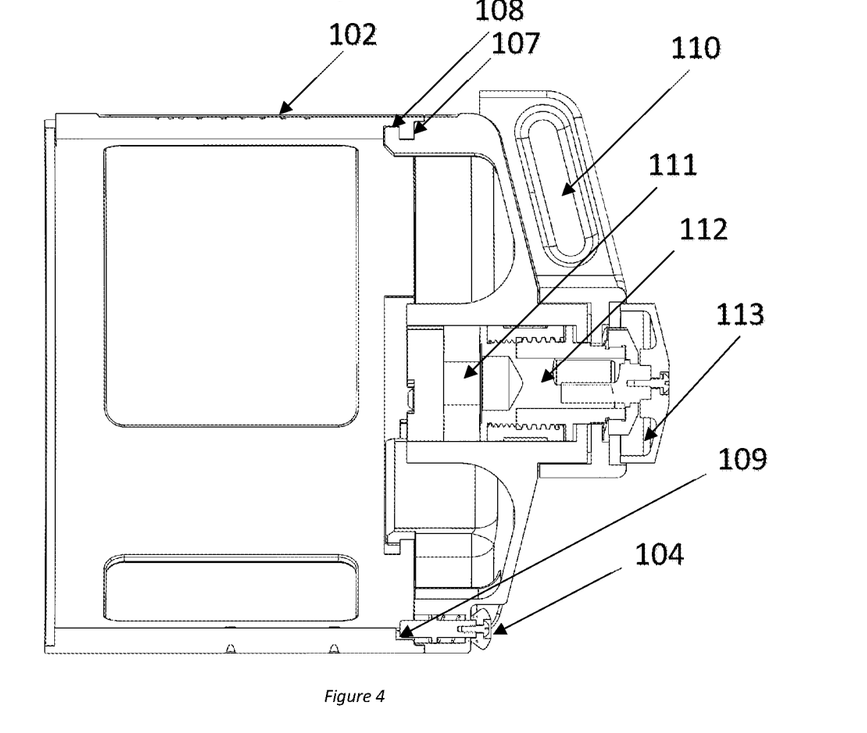
FIG. 4 illustrates a section view of the center frame and removable frame assembly, according to an example embodiment of the present disclosure.

In the section cut shown in FIG. 4 the mating features of the removable frame 103 and center frame 102 can be seen. The male retention feature 108 is engaged with the female retention features 107. The locking pin assembly 104 is fully engaged with the rotational locking feature 109 (e.g., a keyway) on the center frame 102. Since the locking pin assembly 104 is fully engaged with the rotational locking feature 109 of the center frame 102, the removable frame 103 cannot be readily rotated or removed from the center frame 102.

FIG. 4 further shows the features retained in the removable frame assembly 103. Namely, the drag lever 110, spool bearing 111, drag cam assembly 112, and drag adjustment knob 113 are mated with the removable frame assembly 103. The drag lever 110 is configured to expand and contract the drag cam assembly 112 with large adjustments. The drag adjustment knob 113 allows for more refined tuning of the cam assembly 112. The spool bearing 111 is also actuated at this moment.

Figure 5:
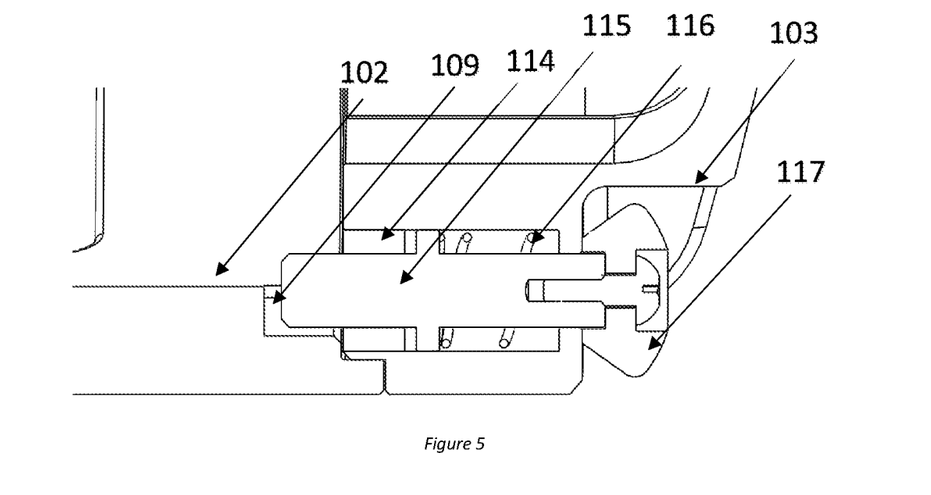
FIG. 5 illustrates a detailed section view of a locking assembly on the removable frame assembly, according to an example embodiment of the present disclosure.

FIG. 5 is a section cut of the locking pin assembly 104. Locking pin assembly 104 includes a locking pin 115 that is retained between a bushing 114 that allows the pin 115 to slide linearly, and a spring 116 that biases the pin 115 closed. The user can pull the locking pin 115 via the pin knob 117. The pin 115 will then disengage the rotational locking feature 109 in the center frame 102.

Figure 6:
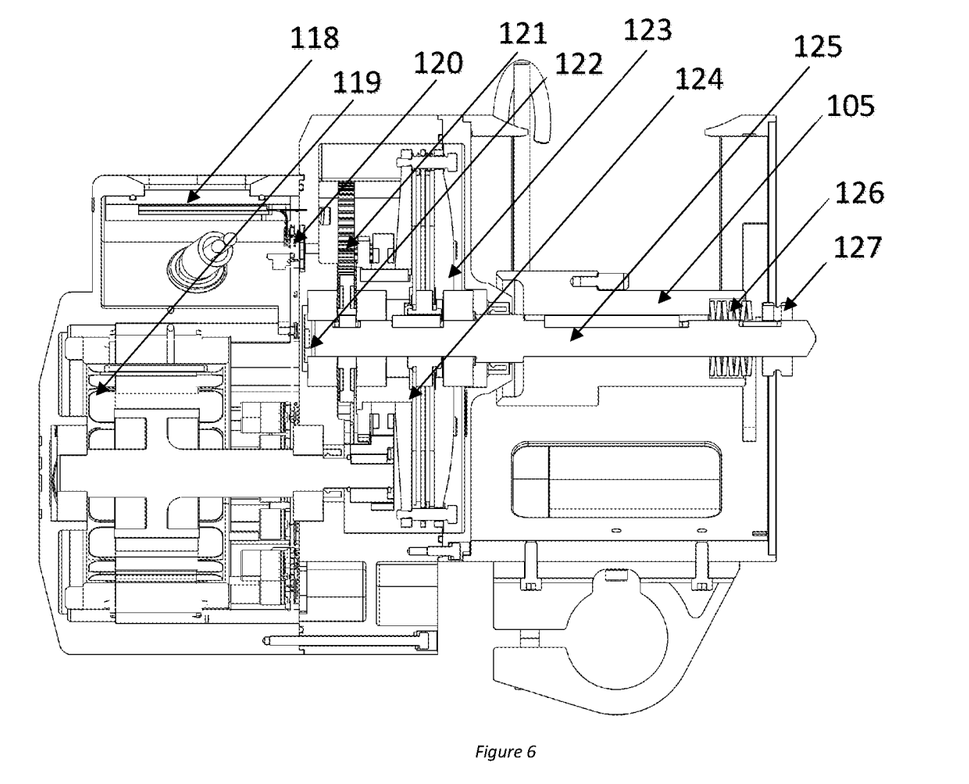
FIG. 6 illustrates a section cut of the center frame, according to an example embodiment of the present disclosure.

A section cut of the frame assembly is shown in FIG. 6 depicts some of the sub-assemblies retained to the frame assembly 100. For example, the user interface 118, brushless direct current motor 119, processor board 120, level wind system 121, spool monitoring system 122, drag clutch assembly 123, spool drive system 124, and spool shaft 125 are retained within the frame assembly 100 irrespective of whether spool 101 is removed. These critical systems are fully protected from the elements and the user is relieved from engaging with them when swapping spools. The spool hub 105, drag compression springs 126, and drag compression spring retainer assembly 127 are fixed to the spool shaft 125. The spool 101 and removable frame 103 have been disassembled from the frame assembly 100.

Figure 7:
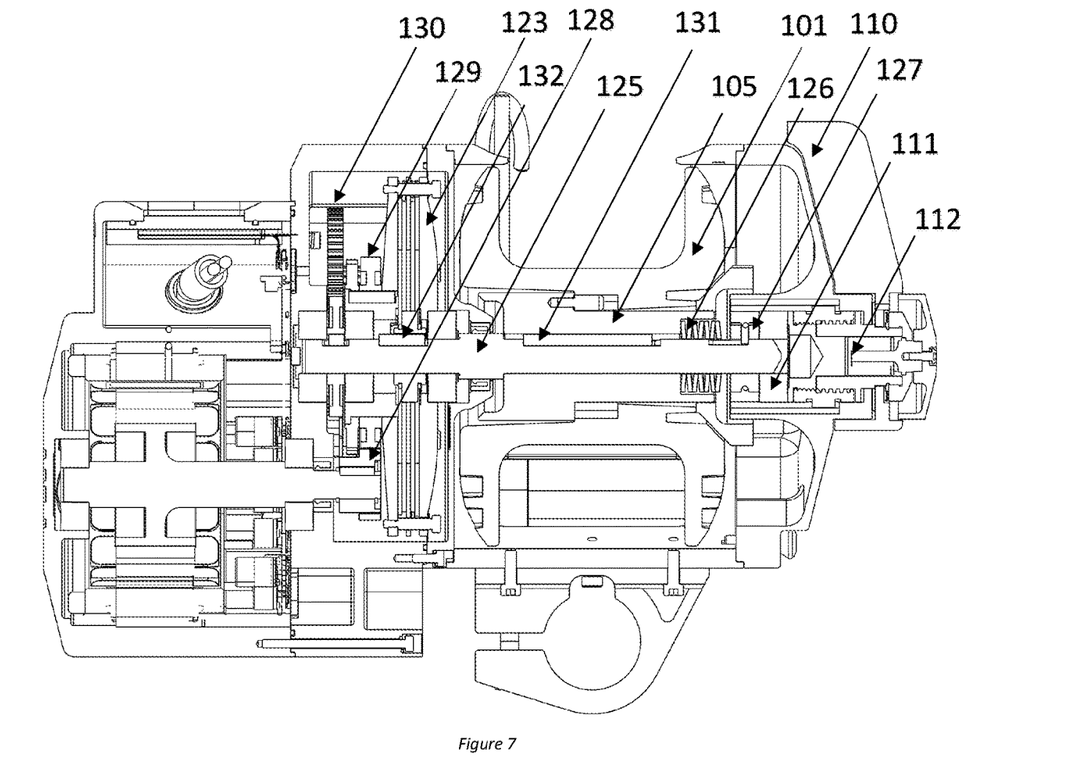
FIG. 7 illustrates a section cut of a full reel assembly, according to an example embodiment of the present disclosure.

FIG. 7 illustrates a section cut of a fully assembled reel and the load path to create drag or friction on the spool shaft 125. For example, when the lever arm 110 rotates, the drag cam assembly 112 expands. As the drag cam assembly 112 expands linearly, pressure applied to drag clutch assembly 123. More specifically, pressure is put on the spool bearing 111, drag compression spring retainer assembly 127, drag compression springs 126, spool hub 105, spool shaft 125, and finally the drag clutch assembly 123. The motor gear 128 meshes with the spool gear 129. When the motor 119 rotates the drag clutch assembly 123, torque and motion is transmitted to the spool shaft 125 through a drag hub spool key 132.

Figure 8:
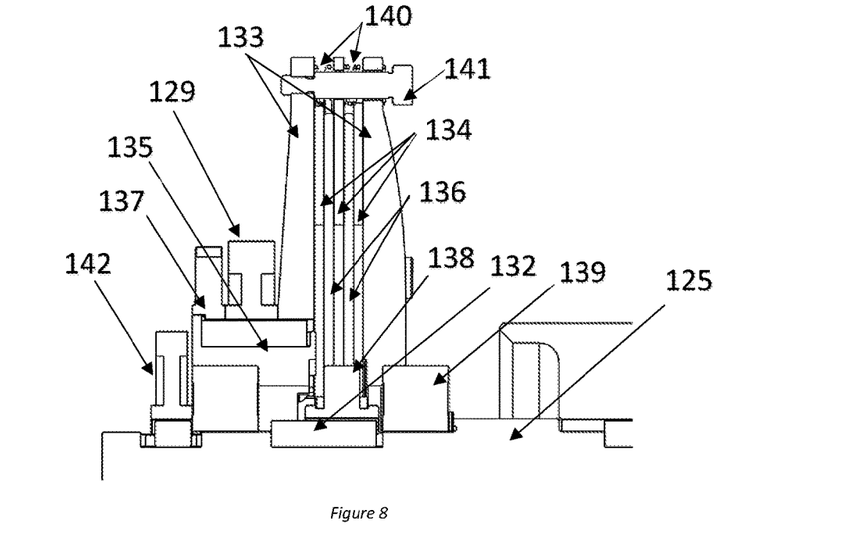
FIG. 8 illustrates a section cut view drag and drive components, according to an example embodiment of the present disclosure.

FIG. 8 shows a more detailed section cut of the drag clutch assembly 123 and spool drive assembly 124. The spool shaft 125 is free to rotate in the reel. The drag clutch assembly 123 is composed of several components to transmit torque and motion from the motor 119 to the spool shaft 125. The drag pressure plates 133 are compressed between the drive hub 135 and drag thrust bearing 139. The spool gear 129 is also attached to the drive hub 135. The drive hub 135 is free to spin about the spool shaft 125. The drag clutch assembly 123 and drive hub 135 only rotate in one direction due a one way bearing system or anti reverse ratchet 137. Drag discs 134 are sandwiched between drag washers 136 and drag pressure plates 133. As friction between the drag discs 134 and drag washers 136 increases torque and motion is transferred from the drag washers 136 to the drag washer hub 138. The drag washer hub 138 engages with the spool shaft 125 through a drag hub spool key 132. At this point torque and motion are transferred from the motor 119 through the drive hub 135, the drag clutch assembly 123, and to the spool shaft 125.

Figure 9:
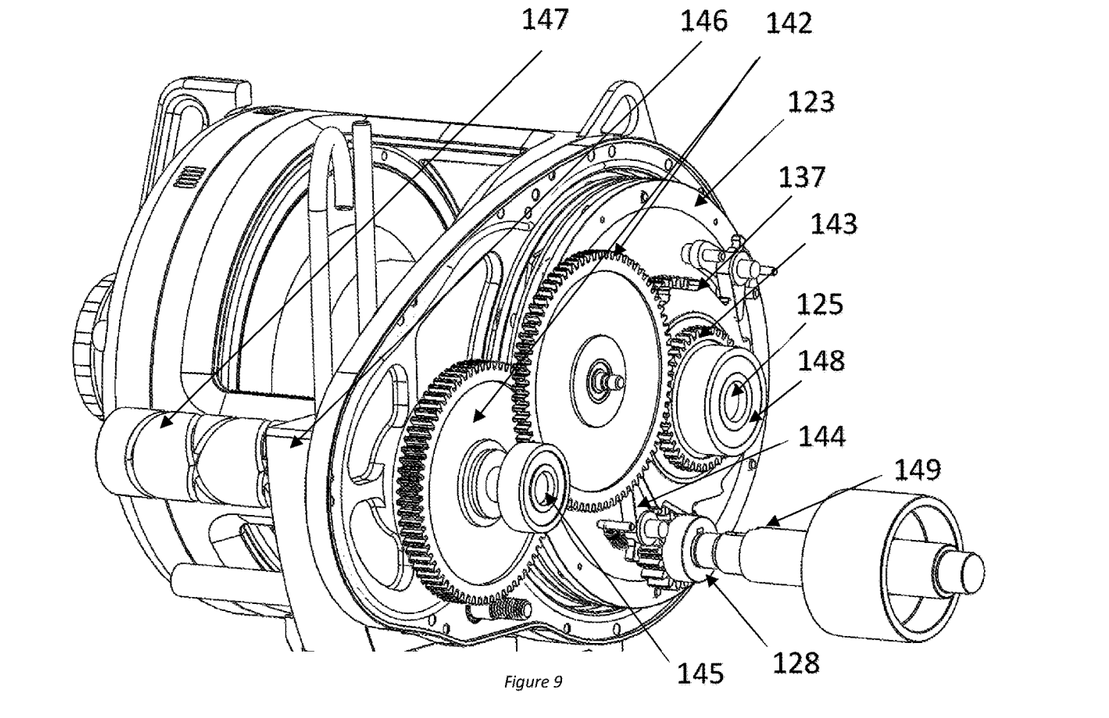
FIG. 9 illustrates an exposed view of a level wind system and drive assembly, according to an example embodiment of the present disclosure.

FIG. 9 shows the adjustable level wind system 130. The spool shaft level wind gear 143 rotates with the spool shaft 125. There are level wind gears 142 attached to the level wind spool gear 143, which are speed reduction gears. The final level wind gear 142 is attached to the level wind drive shaft 145. The level wind drive shaft 145 is attached to the level wind diamond screw 147, which converts rotation of the gears to linear movement of the level wind guide assembly 146 (described in greater detail with reference to FIG. 11).

FIG. 9 also depicts the anti-reverse ratchet 137 or "one way" system. The anti-reverse ratchet 137 coupled with the anti-reverse pawl 144 resists motion of the drive hub 135 and therefore the drag clutch assembly 123 when the spool shaft 125 rotates to release line. An alternative would be to place a one way bearing along the rotational path of the drive hub 135 or motor shaft 149.

Figure 10:
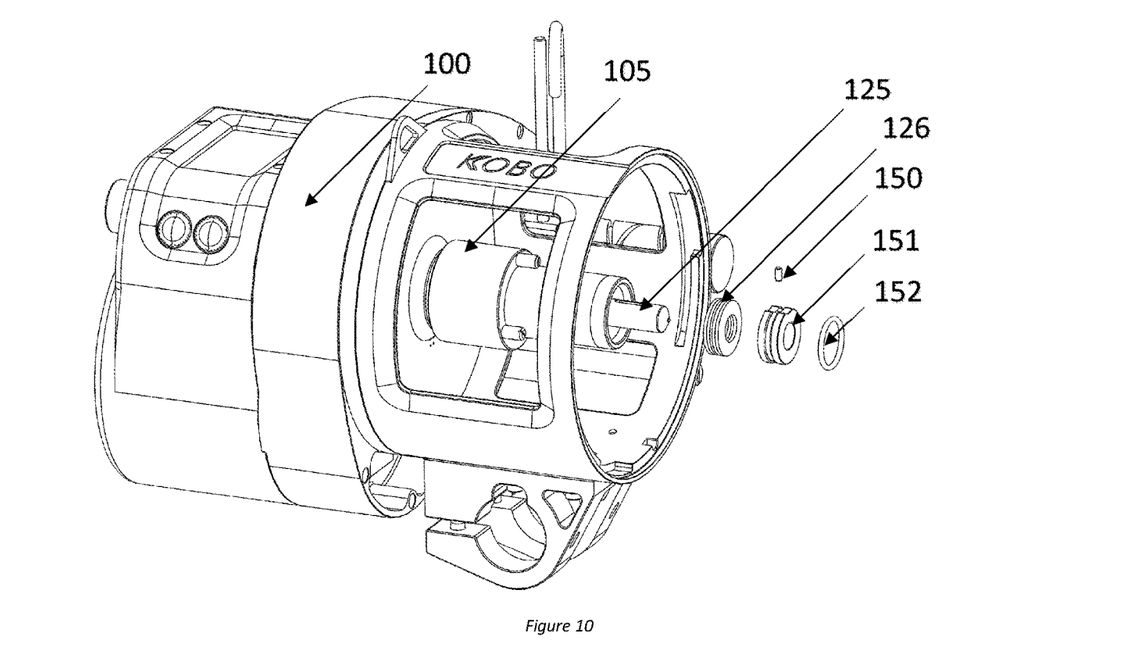
FIG. 10 illustrates an exploded view of a drag spring assembly, according to an example embodiment of the present disclosure.

FIG. 10 illustrates a user adjustable drag springs 126. When the side frame 103, spool 101 and spool nut 106 are removed (as discussed previously above), the drag spring spacer assembly 127 can be readily removed. A rubber o-ring 152 retains a drag spring pin 150 within the drag spring spacer 151. The drag spring pin 150 is retained within a spool shaft 125 keyway. Once the drag spring spacer 151 is removed the drag springs 126 can be changed or rearranged to adjust the spring rate.

Figure 11:
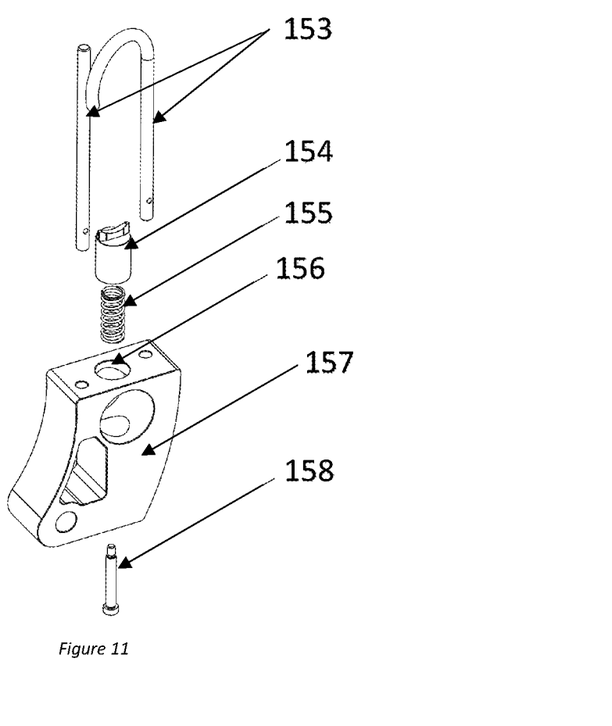
FIG. 11 illustrates an exploded view of a level wind guide block, according to an example embodiment of the present disclosure.

FIG. 11 shows the removable level wind line guide assembly 146. Level wind line guide assembly 146 includes line guides 153. Line guides 153 are configured to direct fishing line onto the spool. In various embodiments, line guides may be vertical columns or, alternatively, looped or J-shaped protrusions. Level wind line guide assembly 146 includes a guide block 157 with a through hole bore 156 to fit the guide block pawl 154, the guide pawl spring 155, and guide pawl release pin 158. Since through hole bore 156 is positioned in such a specific way minimal parts are needed to execute its function. The guide block 157 is disposed along the level wind diamond screw 147. In this way, the entire level wind guide assembly 146 moves linearly along the level wind diamond screw 147 (so as to evenly "guide" fishing line onto the spool in a level and repetitive manner along the circumference of the spool).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A removable reel system, comprising:
   a frame;
   a removable frame assembly;
   a first spool; and
   a spool nut configured to fix first spool to the frame;
   wherein the first spool affixed to the frame when the removable frame assembly is coupled to the frame via a locking assembly disposed on the removable frame assembly,
   wherein the first spool is removable from the frame by disengaging the locking assembly to uncouple the removable frame assembly from the frame and removing the spool nut from the frame, and
   wherein a second spool is attachable to the frame by reattaching the spool nut to fix the second spool to the frame prior to engaging the locking assembly to couple the removable frame assembly to the frame.

2. The removable reel system of claim 1, wherein the removable frame assembly is rotatably coupled to the frame, and wherein the removable frame assembly includes at least one protrusion, and wherein the frame includes at least one recess, such that the protrusion is configured to translate within the recess.

3. The removable reel system of claim 1, wherein the locking assembly engages a keyhole disposed on the frame.

4. The removable reel system of claim 1, wherein the locking assembly includes a locking pin retained within a bushing, such that the locking pin is configured to translate laterally within the bushing, wherein the locking assembly includes a spring, configured to bias the locking pin into a closed position.

5. The removable reel system of claim 4, wherein the locking assembly includes a pin knob, configured to be grasped by a user, wherein biasing of the spring may be overcome by pulling the pin knob.

6. The removable reel system of claim 1, further comprising a drag system including:
   a drag lever mated with the removable frame assembly;
   a drag cam assembly mated with the removable frame assembly, wherein rotation of the drag lever expands or contracts a drag cam assembly; and
   a drag clutch assembly within the frame on an opposite side of the spool from the drag clutch assembly, wherein the drag clutch assembly comprises a number of drag discs sandwiches between drag washers and drag pressure plates, wherein expansion of the drag cam assembly applies pressure to the drag clutch assembly to create drag on a spool shaft.

7. The removable reel system of claim 6, wherein the drag pressure plates are compressed between a drive hub and drag thrust bearing, wherein the drive hub is free to spin about the spool shaft, and wherein point torque and motion are transferred from a motor to the spool shaft through the drive hub and drag clutch assembly.

8. The removable reel system of claim 6, wherein the drag cam assembly applies pressure to the drag clutch assembly through a load path that comprises a spool bearing, a drag compression spring retainer assembly, drag compression springs, and a spool hub, wherein the drag compression spring retainer assembly, drag compression springs, and spool hub are fixed to the spool shaft.

9. The removable reel system of claim 1, further comprising a drive motor, wherein the drive motor delivers power to a spool shaft to cause rotation of the first spool.

10. The removable reel system of claim 9, wherein power from the drive motor is delivered via a drive hub and a drag clutch assembly to the spool shaft.

11. The removable reel system of claim 1, further comprising an adjustable level wind system.

12. The removable reel system of claim 11, wherein a spool shaft includes a gear configured to rotate the adjustable level wind system.

13. The removable reel system of claim 12, wherein the adjustable level wind system further comprises a guide assembly and a diamond screw, and wherein the diamond screw is configured to convert rotational motion of the gear into linear motion of the guide assembly.

14. The removable reel system of claim 13, wherein the guide assembly includes a guide block configured to engage with the diamond screw.

15. The removable reel system of claim 13, wherein the guide assembly includes an adjustable line guide, configured to direct fishing line onto the first spool.

16. A reel system, comprising:
- a frame assembly including a center frame and a spool hub;
- a spool removably mounted on the spool hub within the center frame of the frame assembly;
- a spool nut configured to fix the spool to the frame assembly; and
- a removable frame assembly detachably coupled to an open end of the center frame, wherein removal and replacement of the spool requires only decoupling of the removable frame assembly and removal of the spool nut.

17. The reel system of claim 16, further comprising a user interface, a brushless direct current motor, a processor board, a level wind system, a spool monitoring system, a drag clutch assembly, a spool drive system, and a spool shaft that are retained within the frame assembly when the spool is removed.

18. The reel system of claim 16, further comprising a drag system including:
- a drag lever mated with the removable frame assembly;
- a drag cam assembly mated with the removable frame assembly, wherein rotation of the drag lever expands or contracts a drag cam assembly; and
- a drag clutch assembly within the frame assembly on an opposite side of the spool from the drag clutch assembly, wherein the drag clutch assembly comprises a number of drag discs sandwiches between drag washers and pressure plates, wherein expansion of the drag cam assembly applies pressure to the drag clutch assembly to create drag on a spool shaft, wherein the spool hub is fixed to the spool shaft.

19. The reel system of claim 16, further comprising a drive motor, wherein the drive motor delivers power to a spool shaft to cause rotation of the spool, wherein the spool hub is fixed to the spool shaft, and wherein power from the drive motor is delivered via a drive hub and a drag clutch assembly to the spool shaft.

20. The reel system of claim 19, wherein the spool shaft includes a gear configured to rotate an adjustable level wind system, wherein the adjustable level wind system further comprises a guide assembly and a diamond screw configured to convert rotational motion of the gear into linear motion of the guide assembly, and wherein the guide assembly includes a guide block configured to engage with the diamond screw.

* * * * *